(12) United States Patent
Charlton et al.

(10) Patent No.: US 7,114,353 B1
(45) Date of Patent: Oct. 3, 2006

(54) DEVICES, SYSTEMS AND METHODS FOR USE IN FABRICATING DOORLITES, SIDELITES, WINDOWS, WINDOW PANES AND THE LIKE

(76) Inventors: Thomas Jesse Charlton, 13621 4th Ave. Northeast, Seattle, WA (US) 98125; Frank Ross Murray, 10516 SE. 28th St., Beaux Arts, WA (US) 98004

( * ) Notice: Subject to any disclaimer, the term of this patent is extended or adjusted under 35 U.S.C. 154(b) by 0 days.

(21) Appl. No.: 10/684,695

(22) Filed: Oct. 14, 2003

Related U.S. Application Data

(62) Division of application No. 10/142,665, filed on May 8, 2002, now abandoned.

(51) Int. Cl.
*C03B 23/025* (2006.01)
(52) U.S. Cl. ............................................. 65/107; 65/93
(58) Field of Classification Search ................ 65/93, 65/255, 275, 107, 106; 264/220
See application file for complete search history.

(56) References Cited

U.S. PATENT DOCUMENTS

| | | | | |
|---|---|---|---|---|
| 789,191 | A * | 5/1905 | Wadsworth | 65/93 |
| 2,592,258 | A | 4/1952 | Economakis | 41/22 |
| 3,121,977 | A | 2/1964 | Bersudsky | 50/271 |
| 3,477,836 | A | 11/1969 | Glynn et al. | 65/121 |
| 3,661,613 | A | 5/1972 | Contrael et al. | 117/37 R |
| 4,189,888 | A | 2/1980 | Blitzer, Jr. | 52/484 |
| 4,286,981 | A * | 9/1981 | Clasen et al. | 65/169 |
| 4,364,763 | A * | 12/1982 | Rennerfelt | 65/22 |
| 4,671,031 | A | 6/1987 | Intengan | 52/203 |
| 4,822,397 | A * | 4/1989 | Crossley | 65/107 |
| 4,880,485 | A | 11/1989 | Lewis et al. | 156/108 |
| 5,079,886 | A | 1/1992 | Downs | 52/314 |
| 5,123,211 | A | 6/1992 | Schlicht et al. | 52/202 |
| 5,454,193 | A * | 10/1995 | Hrifko | 49/501 |
| 5,571,598 | A | 11/1996 | Butler et al. | 428/156 |
| 5,622,019 | A * | 4/1997 | Dorough, Jr. | 52/308 |
| 5,834,124 | A | 11/1998 | Pease, III et al. | 428/430 |
| 5,997,672 | A | 12/1999 | Barr | 156/100 |
| 6,138,433 | A | 10/2000 | Ridge | 52/786.11 |
| 6,240,685 | B1 | 6/2001 | Eichhorn | 52/204.61 |
| 6,250,027 | B1 | 6/2001 | Richards | 52/204.59 |
| 6,372,327 | B1 | 4/2002 | Burnham et al. | 428/156 |
| 6,586,077 | B1 | 7/2003 | Pettis | 428/192 |
| 6,668,586 | B1 * | 12/2003 | Lindenberg | 65/23 |

FOREIGN PATENT DOCUMENTS

| | | |
|---|---|---|
| EP | 0 967 072 A2 | 12/1999 |
| GB | 457953 | 12/1936 |
| GB | 671097 | 4/1952 |
| GB | 2 368 047 A | 4/2002 |
| WO | WO 01/62681 A1 | 8/2001 |

* cited by examiner

*Primary Examiner*—Sean Vincent
(74) *Attorney, Agent, or Firm*—Black Lowe & Graham

(57) ABSTRACT

Artistic panes having flat and planar margins with laterally offset central regions and deformations, as well as devices and methods for making the same, are shown and described. Devices and assemblies for manufacturing such artistic panes incorporate support members and raised boundary members, and can incorporate masses and/or piles of powder to create various deformations in the artistic panes. Methods of manufacturing such artistic panes can incorporate slump processes, sag processes and rolling processes.

26 Claims, 13 Drawing Sheets

DEVICES, SYSTEMS AND METHODS FOR USE IN FABRICATING DOORLITES, SIDELITES, WINDOWS, WINDOW PANES AND THE LIKE

This is a divisional application of Ser. No. 10/142,665 filed May 8, 2002, now abandoned.

BACKGROUND OF THE INVENTION

1. Field of the Invention

The present invention is directed toward devices, systems and methods for use in manufacturing window panes, windows, door lites, and similar products.

2. Description of the Related Art

Windows incorporating panes of glass or other materials have been commercially available for hundreds of years. During that time period, many developments have taken place in the art of fixed windows, movable windows, French doors and lites for doors and for installing next to doors. For example, windows have been developed that filter out ultraviolet light, that resist scratching or shattering, that do not form jagged edges when broken, or that have other features making the glass suitable for special applications.

For most applications, advancement in glass technology has been directed toward improving visibility through the glass or for improving other features of the glass without adversely effecting visibility.

Artistic windows, such as decorated windows or stained glass windows, are designed to be attractive. Visibility through an artistic window is not necessarily the primary goal. Consequently, artistic windows have been developed with beveled edges, etched surfaces, multiple colors or embedded objects.

In the case of float or sheet glass, whether it is clear, etched, frosted or otherwise treated, the perimeter of the sheet is flat and planar and can easily be inserted into a frame. For odd shaped glass, however, where the boundary is not planar, a standard frame will not work. In such cases, the glass is typically separated into small pieces which are interconnected by cames to form decorative windows. The decorative window can then be framed within a traditional window, or can be inserted into a door for use as a door lite, or inserted into a wall for use as a side lite or a re-lite.

Accordingly, there is a need in the industry for an improved system that can incorporate odd shaped panes into traditional windows, doors and walls.

BRIEF SUMMARY OF THE INVENTION

The present invention is directed toward devices, systems and methods for manufacturing artistic panes, doorlites and windows incorporating artistic panes, and the like. Embodiments of the present invention allow an operator to deform a pane into a complex shape, while retaining a flat and planar margin. As a result, the artistic pane can be inserted into a traditional window or lite.

One embodiment of the present invention incorporates an artistic pane having a unitary body with a central region and a marginal region. The central region has a first portion that is generally planar, and a plurality of second portions that are laterally offset from the first portion. The offset first and second portions give the artistic pane a complex surface texture. The marginal region is offset laterally with respect to the first portion of the central region. In addition, the marginal region is substantially flat and planar to facilitate insertion of the artistic pane into a frame or came of a window or lite.

Another embodiment of the present invention is directed toward a device for making such windows. The device incorporates a support member having an upper surface, and at least one raised boundary member positioned on the upper surface of the support member. The upper surface of the support member is made from a refractory material, and the entire support member is configured to fit within an oven during use. The raised boundary member is disposed around an enclosed portion of the upper surface of the support member. An inner edge portion of the raised boundary member is flat and planar and has an upper surface made from a refractory material. The inner edge portion of the raised boundary member is adjacent to the enclosed portion of the support member. As a result, when a sheet of glass is placed over both the inner edge portion of the raised boundary member and the enclosed portion of the support member, and is heated above a thermoplastic temperature, the glass will sag against the enclosed portion of the support member, but will remain flat and planar along the inner edge portion of the raised boundary member. Thus, the processed sheet of glass will have a central region that has an artistic shape, and a marginal region that is offset laterally from the central region and that is flat and planar to facilitate insertion of the pane into a window, door or wall. Embodiments of this invention can incorporate various bodies positioned within the enclosed portion of the support member to deform the shape of the sagging glass and create additional artistic contours in the central portion of the glass.

Another embodiment of the present invention is directed toward a method for forming artistic panes of glass. The method includes the steps of heating a sheet of material to a temperature in excess of the thermoplastic point of the material, deforming a central portion of the sheet and material into a complex shape, and retaining a marginal portion of the sheet of material in a planar shape. The deforming step of the method can be performed by sag or slump processes, or by rolling processes.

DETAILED DESCRIPTION OF THE INVENTION

The present detailed description is generally directed toward devices, systems and methods for manufacturing artistic panes and windows and doors incorporating artistic panes. Specific details of certain embodiments of the invention are set forth in the following description and illustrated in FIGS. 1–16 to provide a thorough understanding of the illustrated embodiments. One skilled in the art, however, will understand that the present invention may have additional embodiments, and may be practiced without several of the details described in the following description and illustrated in the figures.

FIGS. 1–4 illustrate an artistic pane 100 according to one particular embodiment of the present invention. In the illustrated embodiment, the artistic pane 100 is a pane of glass having a generally rectangular shape. The inventor appreciates, however, that the artistic pane 100 could be fabricated from other material and could have a wide variety of sizes and shapes, both without deviating from the spirit of the present invention.

Figure 1:
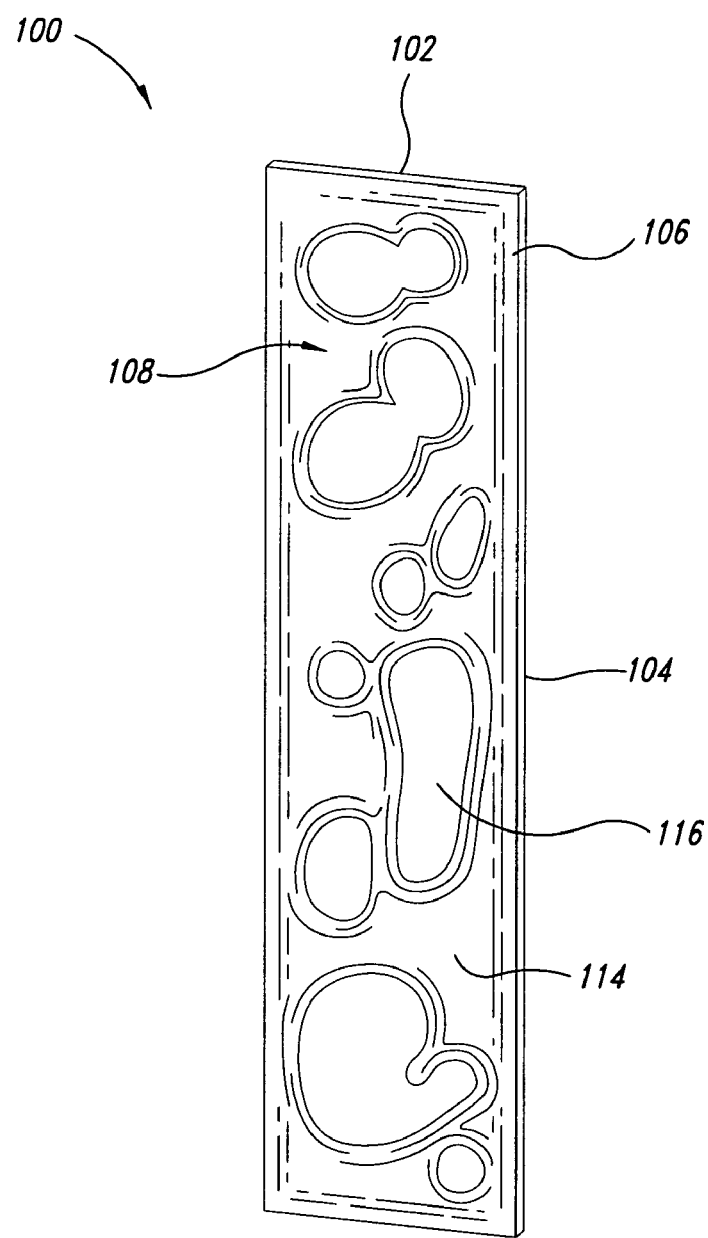
FIG. 1 is an isometric view of an artistic pane according to an embodiment of the present invention.
Figure 2:
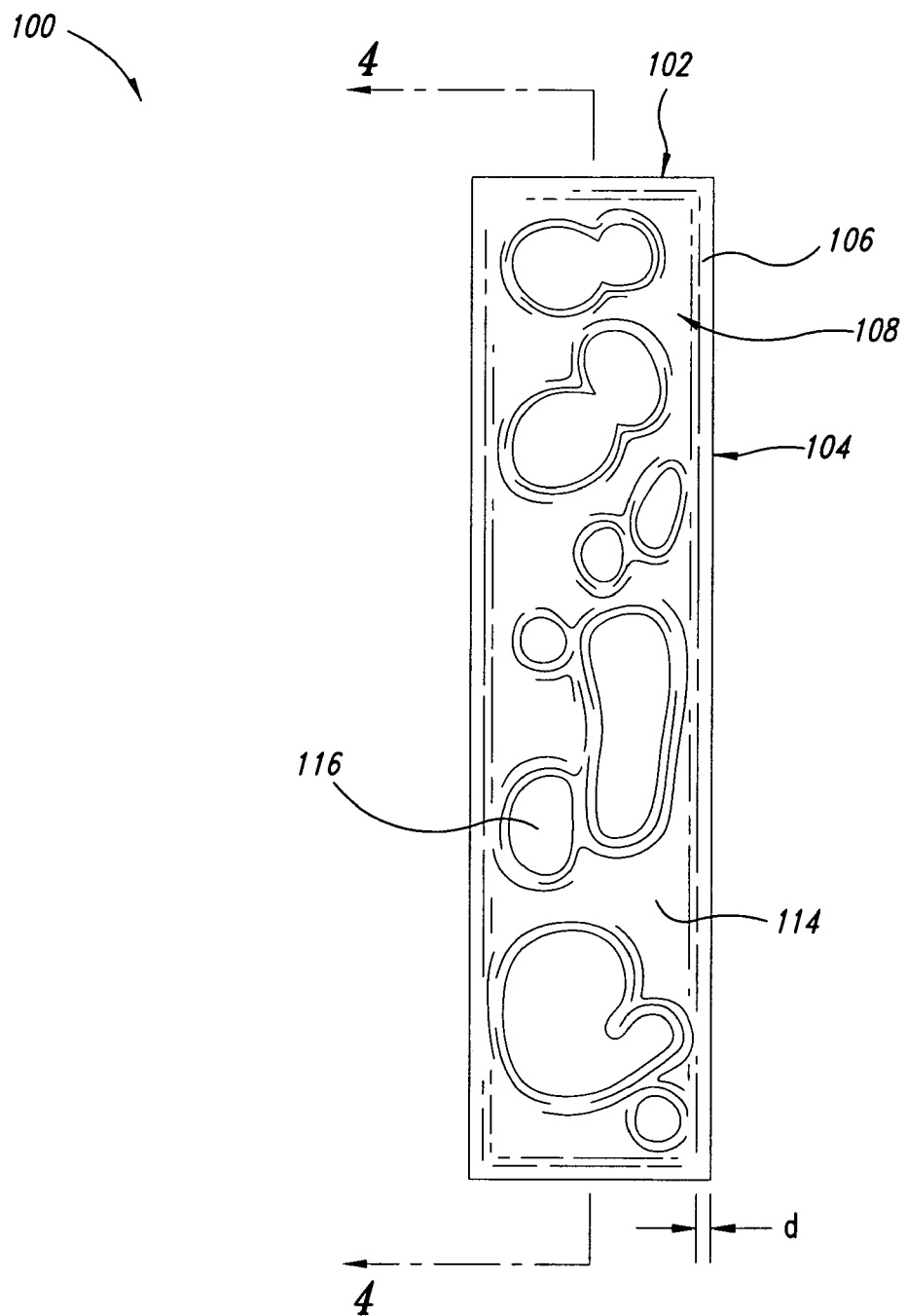
FIG. 2 is a plan view of the artistic pane of FIG. 1.

The illustrated artistic pane 100 has a pair of opposing short sides 102 and a pair of opposing long sides 104. The short sides 102 and the long sides 104 combine to form a rectangular margin 106 extending around the perimeter of the artistic pane 100. The margin 106 is generally planar, and is sufficiently flat to be received in a traditional window frame or a came for a decorative window. As illustrated in FIG. 2, the margin 106 has a depth d from the respective side 102/104 inward toward a central portion 108 of the artistic pane 100. In the illustrated embodiment, the depth d of the margin 106 measures approximately ⅛ inch, although the depth can vary to be suitable for a particular application, without deviation from the spirit of the invention.

Figure 3:
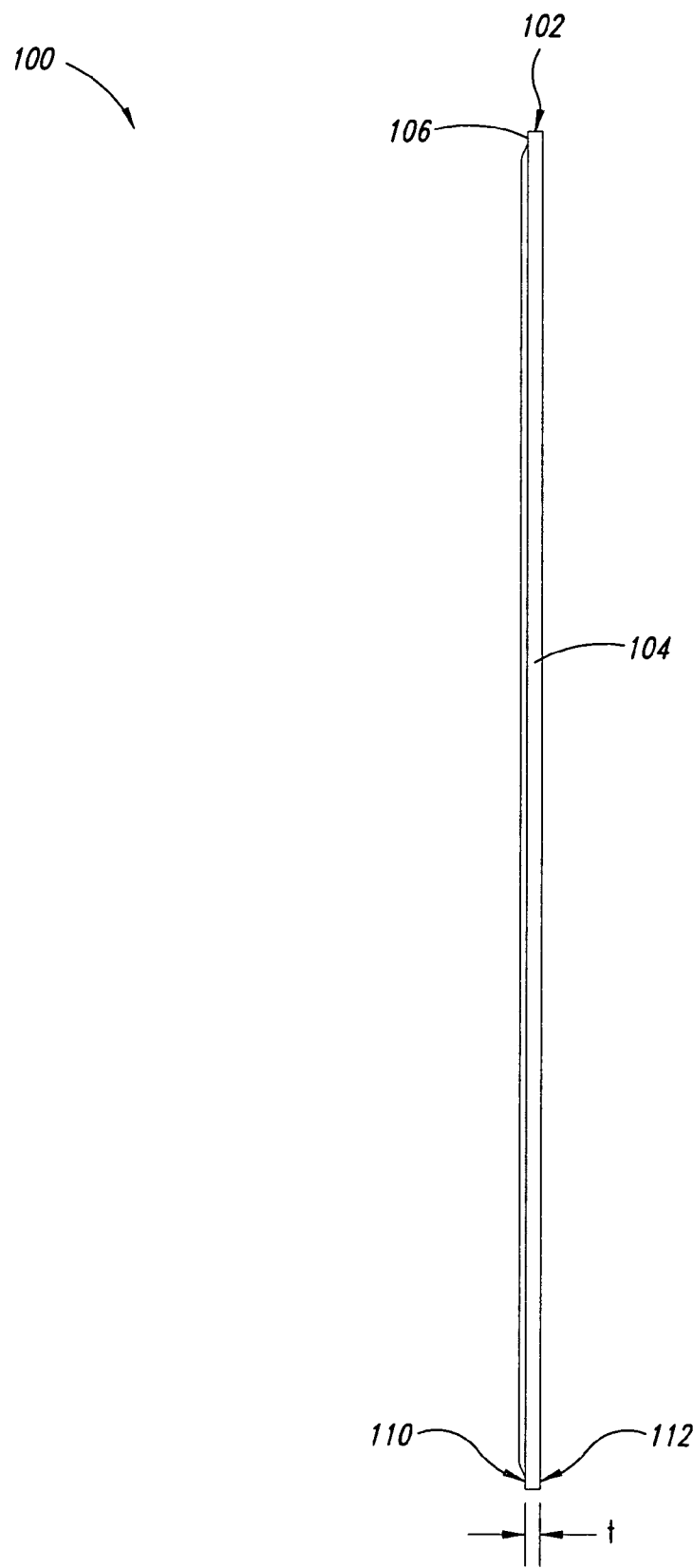
FIG. 3 is a side view of the artistic pane of FIG. 1.

As best illustrated in FIG. 3, the margin 106 has a thickness t between a top surface 110 and a bottom surface 112. In the illustrated embodiment, the thickness t is approximately ⅛ inch, although the thickness can often be 3/16 inch, ¼ inch, ⅜ inch, or any other thickness suitable for a particular frame.

Figure 4:
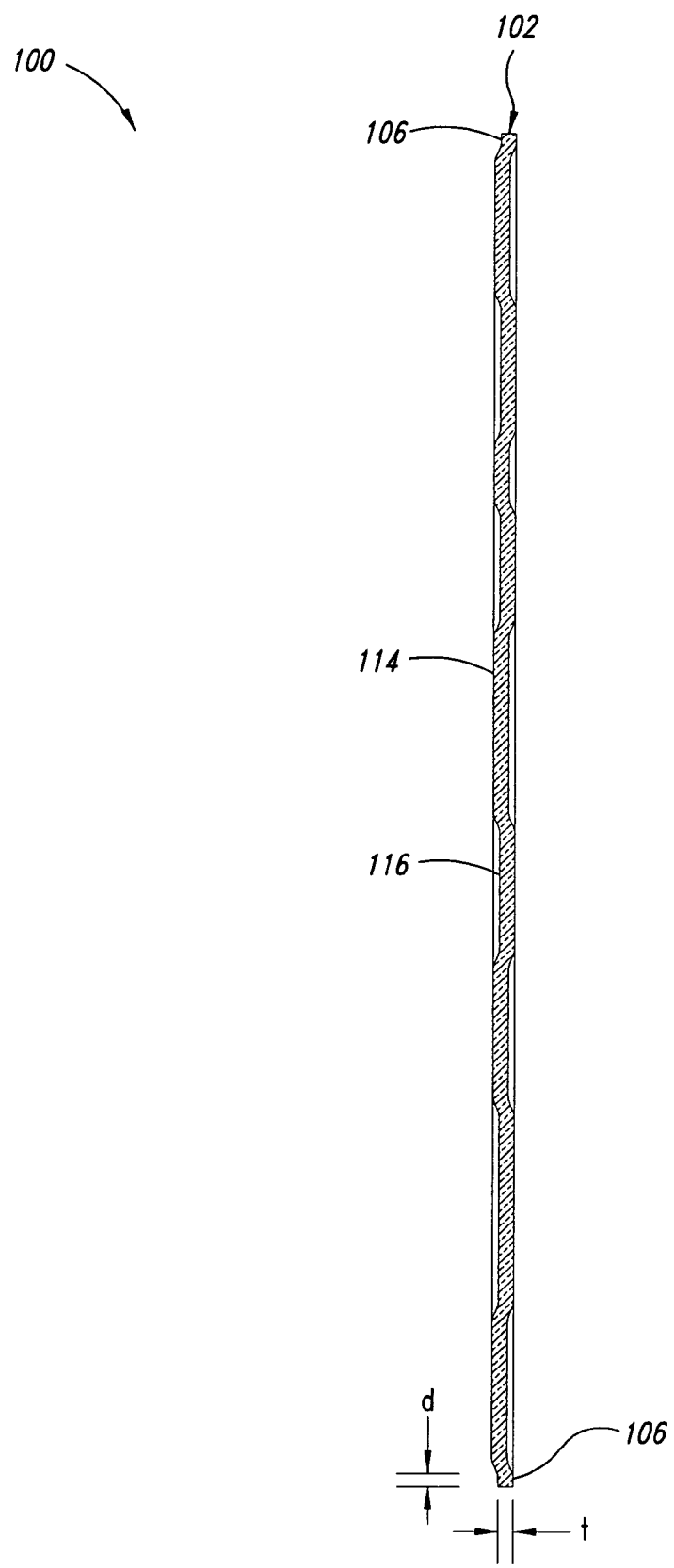
FIG. 4 is a sectional side view of the artistic pane of FIG. 1, viewed along Section 4—4 of FIG. 2.

The central portion 108 is made up of a generally planar surface 114 that is broken up by a number of arbitrarily sized and shaped deformations 116. As best illustrated in FIG. 4, the planar surface 114 is displaced laterally from the margin 106, while the deformations 116 are displaced laterally with respect to the planar surface. In the illustrated embodiment, the deformations 116 are displaced from the planar surface 114 in the lateral direction of the margin 106. The inventor appreciates, however, that the size, shape and direction of the deformations 116 can vary dramatically without deviating from the spirit of the invention.

Figure 5:
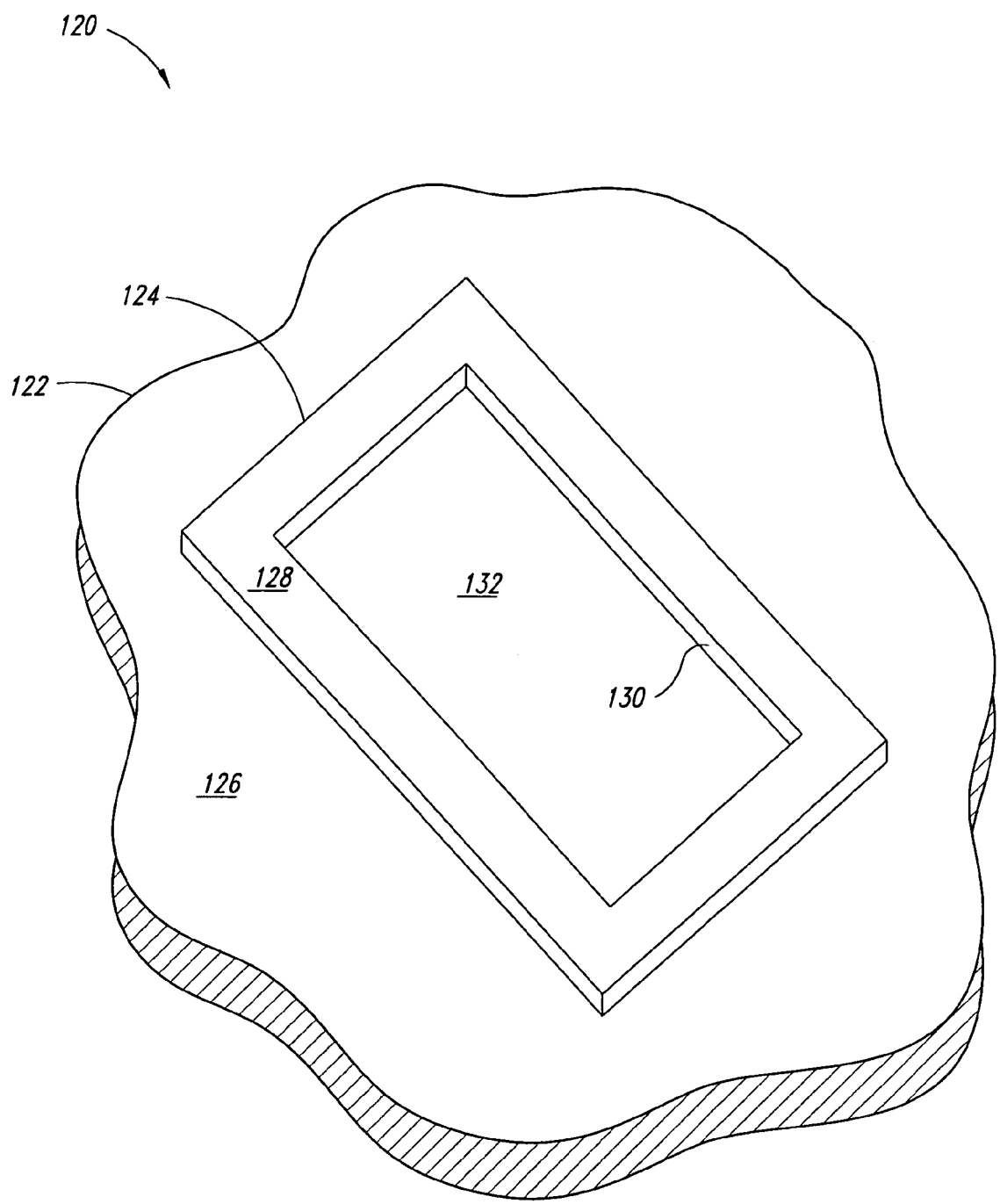
FIG. 5 is an isometric view of a device for forming an artistic pane according to an embodiment of the present invention.

FIG. 5 illustrates a device 120 for forming artistic panes according to one embodiment of the present invention. In the illustrated embodiment, the device 120 incorporates a support member 122 and a raised boundary member 124. The support member 122 is made from a refractory material, such as ceramic. The illustrated support member 122 can be purchased under the brand name M-BOARD, produced by Thermal Ceramics of Augusta, Georgia. The inventor appreciates that other materials may be equivalent to the illustrated material, and that the support member 122 need not be one solid material, but could instead be laminated or otherwise coated with a refractory material.

The support member 122 in the illustrated embodiment has an upper surface 126 that is generally planar in shape. To modify the contour of an artistic pane according to the present invention, the inventor appreciates that the support member 122 can be molded or otherwise formed to create a relief that will transfer to the artistic pane when formed. The inventor appreciates that such modifications do not deviate from the spirit of the present invention, but would constitute equivalent embodiments thereof.

The raised boundary member 124 of the illustrated device 120 is planar in shape and is positioned against the upper surface 126 of the support member 122. In the illustrated embodiment, the raised boundary member 124 is integrally formed on the support member 122. The raised boundary member 124 may be built on top of the support 122, or may be carved out of the support member. The inventor appreciates that, having reviewed this disclosure, one of ordinary skill in the art will appreciate the many equivalent means for forming the raised boundary member 124.

The illustrated raised boundary member 124 has an upper surface 128 that is planar and flat. As described below, the upper surface 128 will ultimately form the margin 106 of the artistic pane 100.

The raised boundary member 124 has an inner edge 130 that extends around the perimeter of a central portion 132 of the upper surface 126 of the support member 122. In the illustrated embodiment, the inner edge 130 is rectangular in shape. The inventor appreciates, however, that the inner edge 130 can have a wide variety of shapes without deviating from the spirit of the invention.

Figure 6:
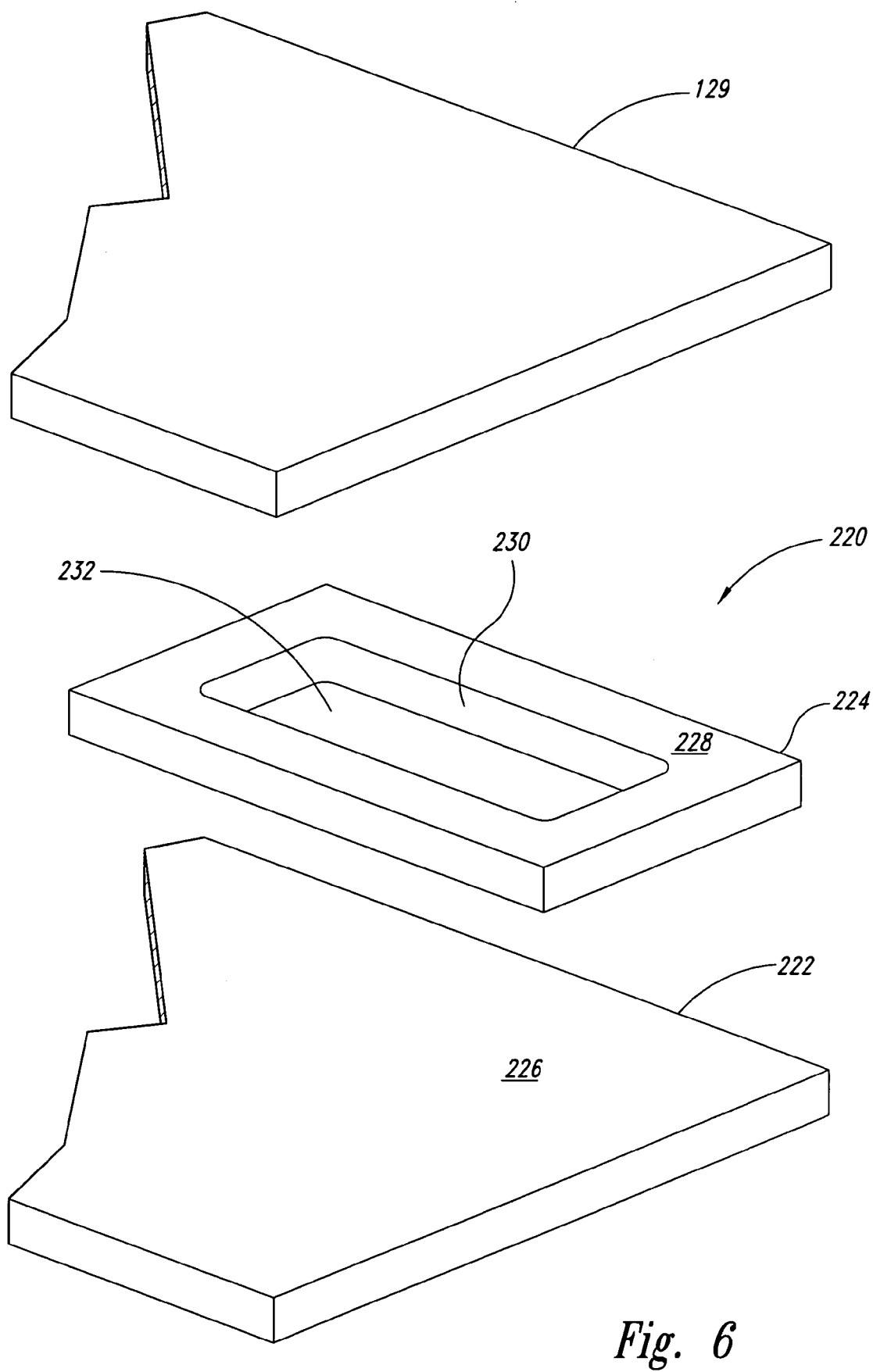
FIG. 6 is an exploded view of a sheet of glass and an assembly for forming an artistic pane according to another embodiment of the present invention.

FIG. 6 is an exploded view of a sheet of glass 129 and a device 220 for forming an artistic pane 100, according to another embodiment of the present invention. The device 220 incorporates a support member 222 and a raised boundary member 224. Similar to that described above, the support member 222 has a substantially planar upper surface 226, and the raised boundary member 224 has a planar upper surface 228.

The raised boundary member 224 in this embodiment is a separate and removable element of the device 220. As such, the raised boundary member 224 can be moved and positioned with respect to the support member 222 as desired by the operator. In addition, the support member 222 can support several raised boundary members 224, which can vary in size and/or shape, facilitating the mass production of artistic panes.

The raised boundary member 224 has an inner edge 230 that extends around a central opening 232, which encircles a portion of the upper surface 226 of the support member 222 during use. In the illustrated embodiment, the inner edge 230 has rounded corners but, as discussed above, the shape of the inner edge can vary dramatically without deviating from the scope of the present invention. In the illustrated embodiment, the raised boundary member 224 is produced by Lydall out of Portsmouth, N.H., under the brand LYTHERM 1401. The illustrated raised boundary member 224 is ⅛ inch thick, although this dimension can vary as will be appreciated one of ordinary skill in the art.

Figure 7:
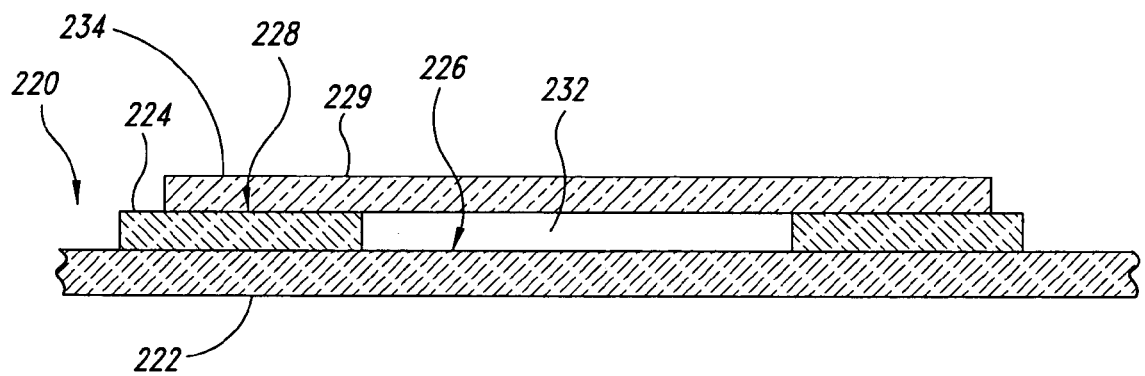
FIG. 7 is a cross-sectional view of a sheet of glass and a device for forming an artistic pane according to an embodiment of the present invention, shown prior to deforming the glass.
Figure 8:
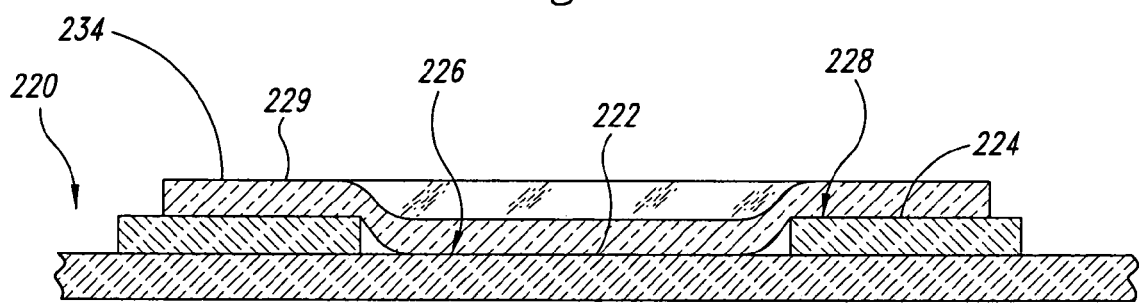
FIG. 8 is a cross-sectional view of the glass and assembly of FIG. 7, shown after deforming the glass.

FIGS. 7 and 8 illustrate one particular embodiment of the device 220 and a sheet of glass 229 according to an embodiment of the present invention. As shown in FIG. 7, the sheet of glass 229 is resting on top of the raised boundary member 224, and is suspended above the upper surface 226 of the support member 222. In the illustrated embodiment, the sheet of glass 229 is oriented with the tin side down. As discussed above, the upper surface 226 can be flat or can be shaped, as desired. An edge portion 234 of the sheet of glass 229 rests on top of the upper surface 228 of the raised boundary member 224. The edge 234 of the sheet of glass 229 can terminate at the desired dimension for use as a window pane, or can be cut after processing to the desired size and shape.

FIG. 8 illustrates the sheet of glass 229 after being heated in an oven for a desired time and temperature. In the illustrated embodiment, the sheet of glass 229 is heated to a temperature above 1320° F. and, preferably, to a temperature above 1400° F. and, in some embodiments, to a temperature above 1500° F. In one embodiment, the temperature is between 1510° F. and 1535° F. At these temperatures, the sheet of glass 229 sags in the central opening 232 until it contacts the upper surface 226 of the support member 222. The upper surface 228 of the raised boundary member 224 prevents the edge 234 of the sheet of glass 229 from sagging. Instead, because the upper surface 228 of the raised boundary member 224 is flat and planar, the edge 234 of the sheet of glass 229 remains flat and planar. The edge 234 of the sheet of glass 229 will ultimately become the margin 106 of the artistic pane 100.

Figure 9:
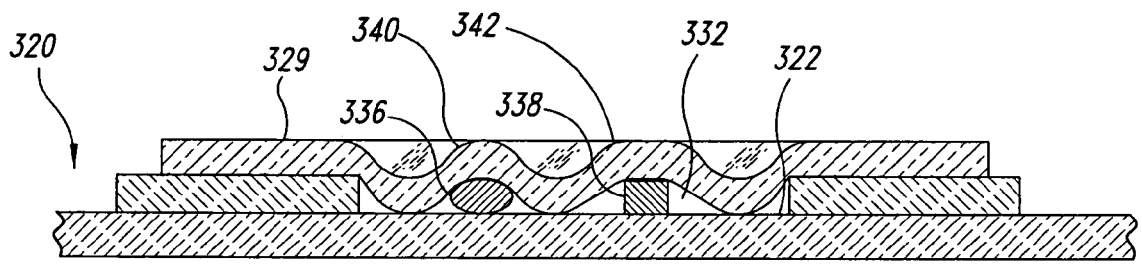
FIG. 9 is a cross-sectional view of an alternate embodiment of the invention, shown after deforming the glass.

FIG. 9 illustrates a device 320 for forming artistic panes according to yet another embodiment of the present invention. In this embodiment, the device 320 is generally the same as that described above in connection with FIGS. 7 and 8. The device 320, however, incorporates a curved mass 336 and a rectilinear mass 338 positioned within a central opening 332 between a sheet of glass 329 and a support member 322. When the sheet of glass 329 is heated to the elevated temperature discussed above, the sheet of glass sags in the central opening 332. In this particular embodiment, the curved mass 336 and the rectilinear mass 338 prevent portions of the sheet of glass 229 from contacting an upper surface 326 of the support member 322. As a result the glass 329 is formed with round deformations 340 and flat deformations 342 in the area that will become a central portion of the artistic pane.

Figure 10:
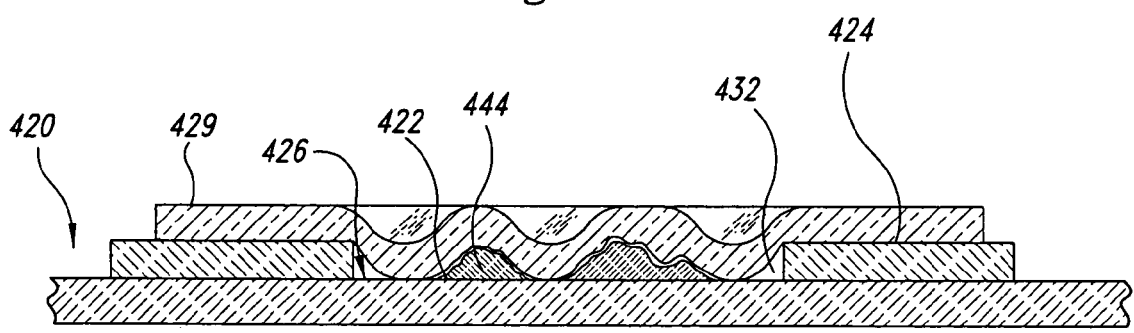
FIG. 10 is a sectional view of another alternate embodiment of the invention, shown after deforming the glass.

FIG. 10 illustrates still another embodiment of a device 420 according to still another embodiment of the present invention. This particular embodiment is similar to that illustrated in FIG. 9. In this embodiment, however, the device 420 incorporates a number of piles 444 of refractory particulates. The piles 444 are placed by the operator on the upper surface 426 of the support member 422 in one or more locations in the central opening 432 of the raised boundary member 424. When the glass 429 sags into the central opening 432, it will conform to the random and slightly deformable shape of the piles 444. Thus, the ultimate shape of the artistic pane can be random and substantially unreproducible, creating an additional artistic effect. The size, shape and distribution of the piles 444 can be controlled as the operator desires.

Figure 11:
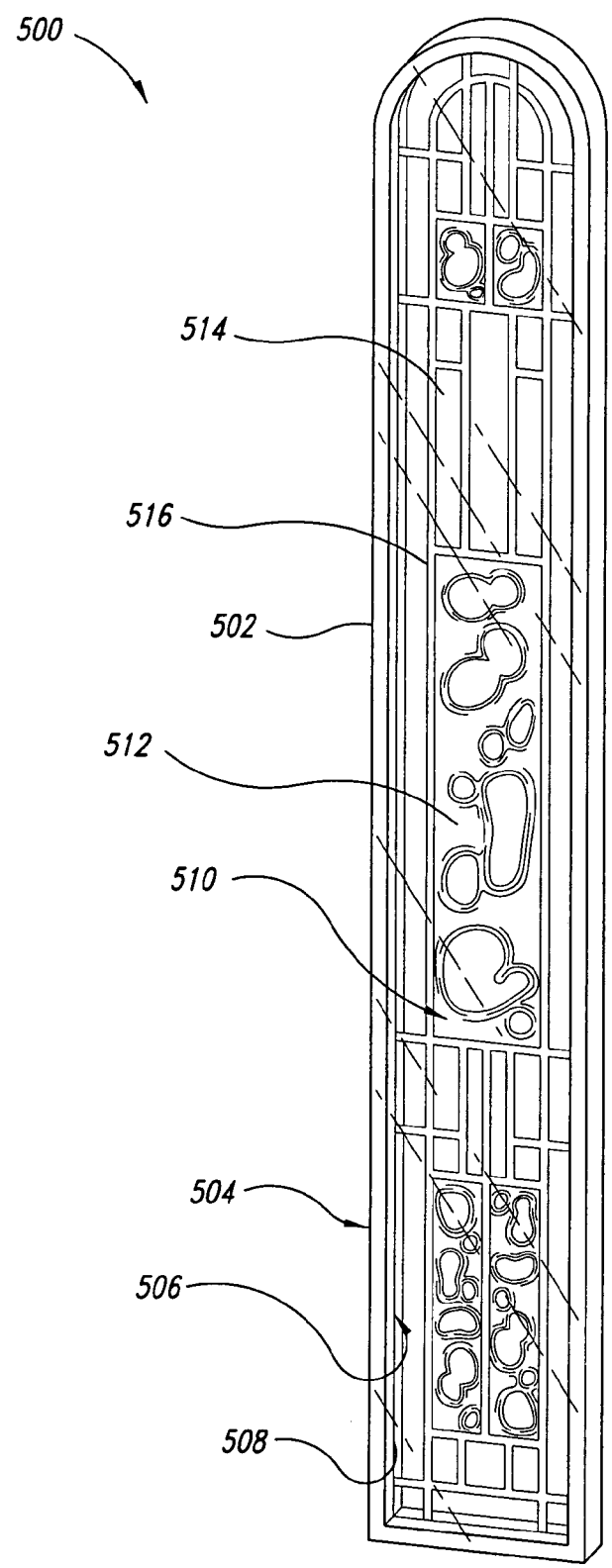
FIG. 11 is an isometric view of a lite according to an embodiment of the present invention.
Figure 12:
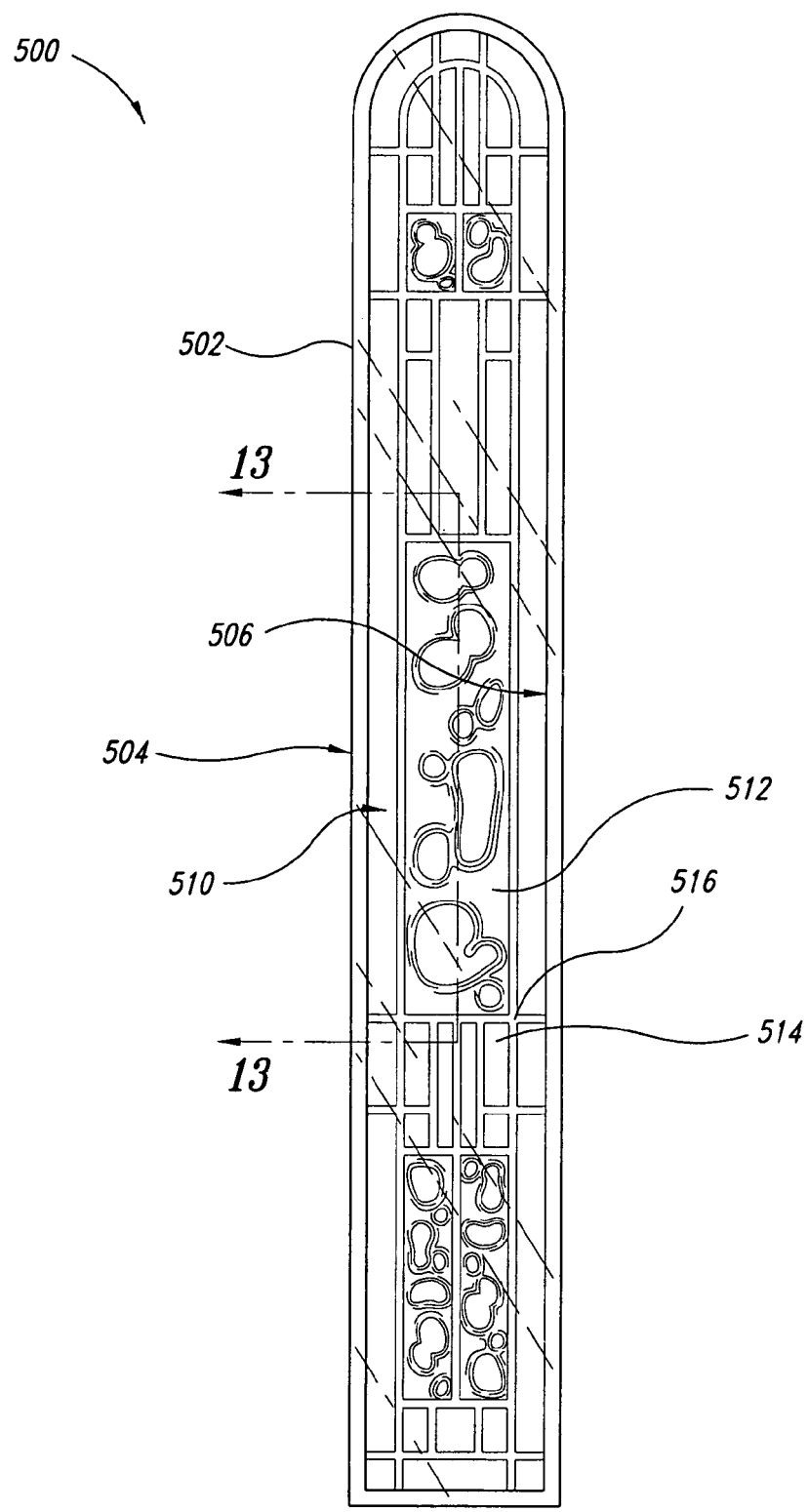
FIG. 12 is a plan view of the lite of FIG. 11.
Figure 13:
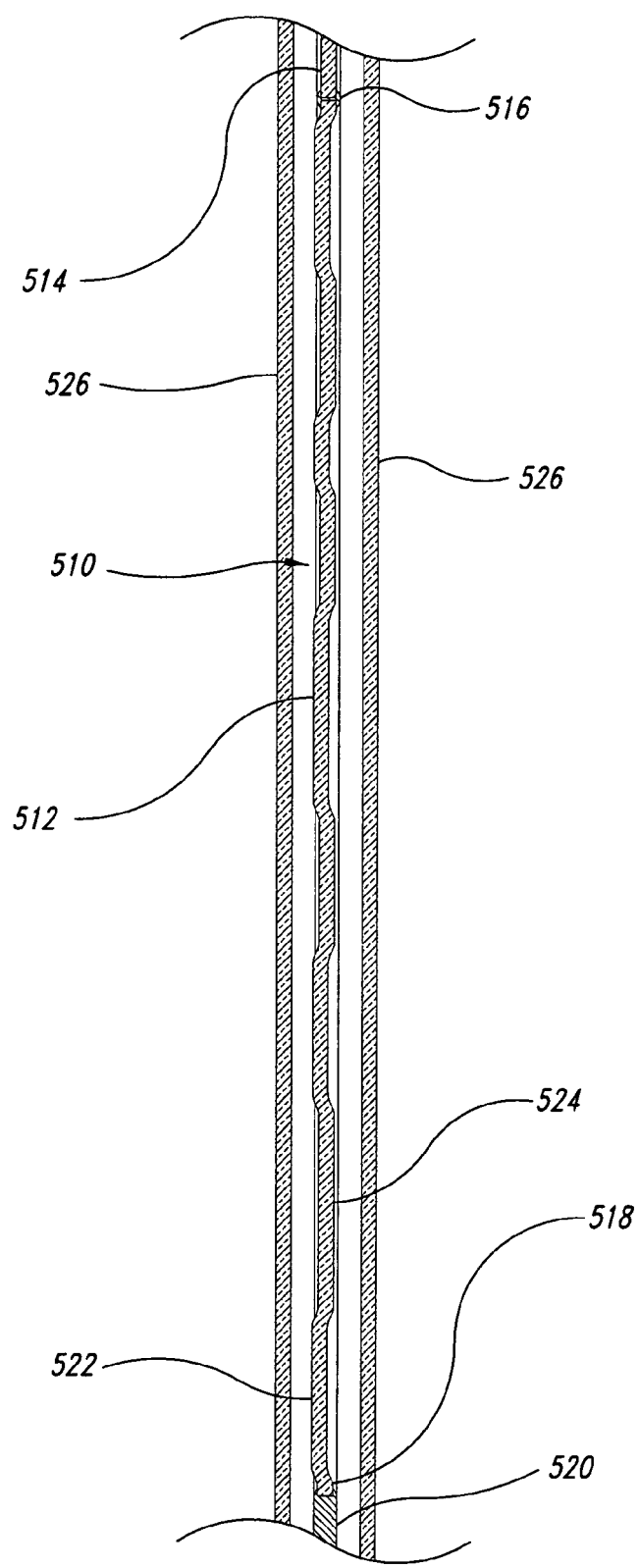
FIG. 13 is a cross-sectional view of the lite of FIG. 11, viewed along Section 13—13 of FIG. 12.

FIGS. 11–13 illustrate a lite 500 or similar decorative window, according to one particular embodiment of the present invention. The illustrated lite 500 has a frame 502 that extends around the perimeter of the lite. The frame 502 can be selected from any number of frames available on the market. One of ordinary skill in the art, having reviewed this disclosure, will appreciate the types of frames that will be suitable for use with the present invention.

The illustrated frame 502 has an outer edge 504 and an opposing inner edge 506 extending around the entire perimeter of the lite 500. The outer edge 504 is adapted to be inserted into a wall or door, as is generally understood in the art. The inner edge 506 is configured with a groove 508 extending around the perimeter of the frame 502. The groove 508 is sized to receive a window 510 such as the decorative window illustrated in the present embodiment.

The window 510 incorporates a number of artistic panes 512 and other panes 514 assembled within the came assembly 516. The size and shape of the artistic panes 512 and the other panes 514, and the configuration of the came assembly 516 can vary dramatically based on user and/or customer desires. The exact configuration of the window 510 is not critical to the present invention beyond the incorporation of the artistic panes 512 into the assembly.

As best illustrated in FIG. 13, a margin 518 of the artistic pane 512 engages a came member 520 to form the window 510. As discussed above, the margin 518 is planer and flat to allow the artistic pane 512 to fit within a came assembly 516, even though the artistic pane incorporates a number of offset regions 522 and deformations 524.

The window 510 is encased between a pair of opposing sheets of glass 526 to seal and/or protect the window 510, or to increase the insulative properties of the lite 500. The inventor appreciates that one of ordinary skill in the art, having reviewed this disclosure, will fully appreciate that the invention can be used with or without such sheets of glass 526, and will fully appreciate how to incorporate sheets of glass into the assembly.

Figure 14:
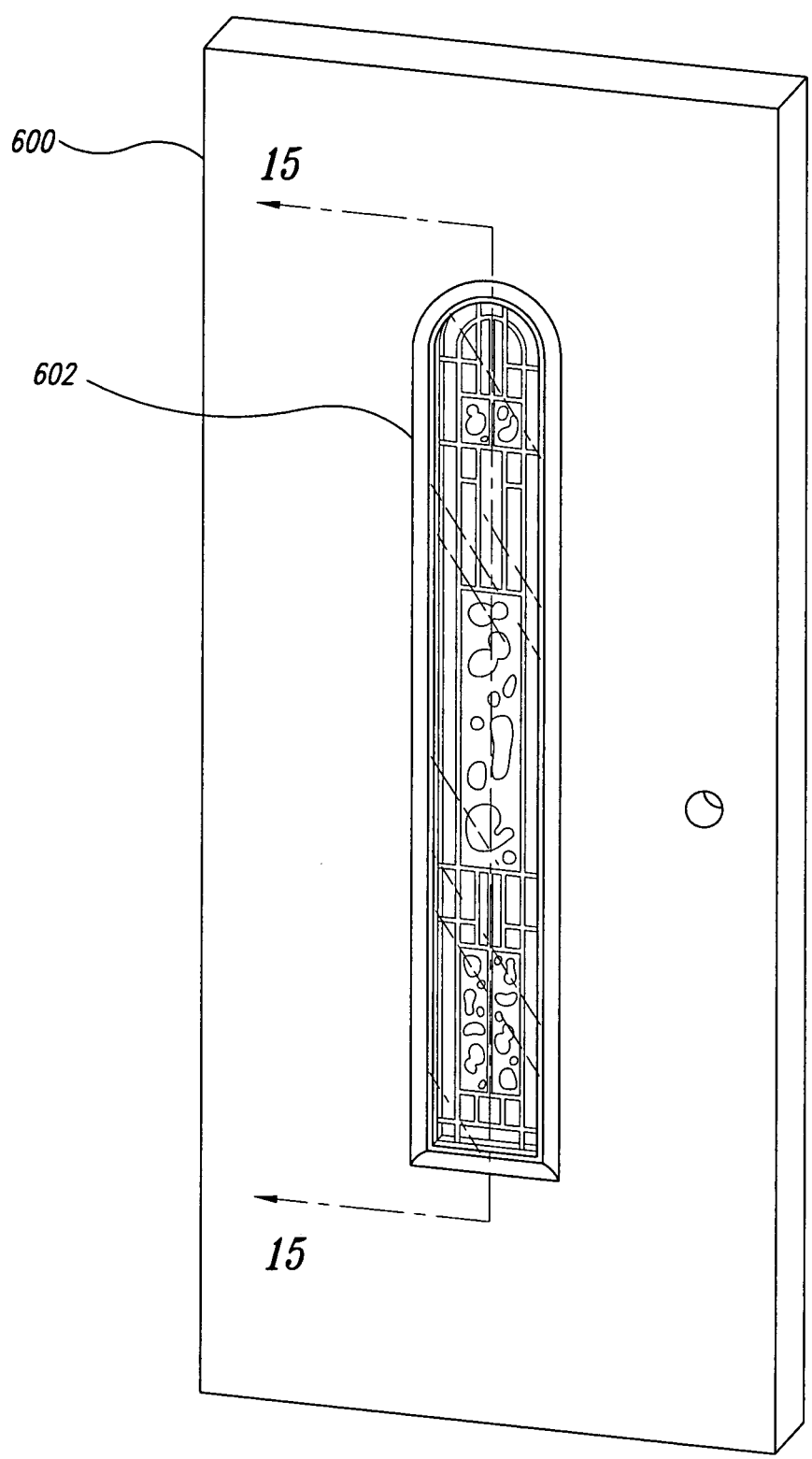
FIG. 14 is an isometric view of a door and a lite according to an embodiment of the present invention.
Figure 15:
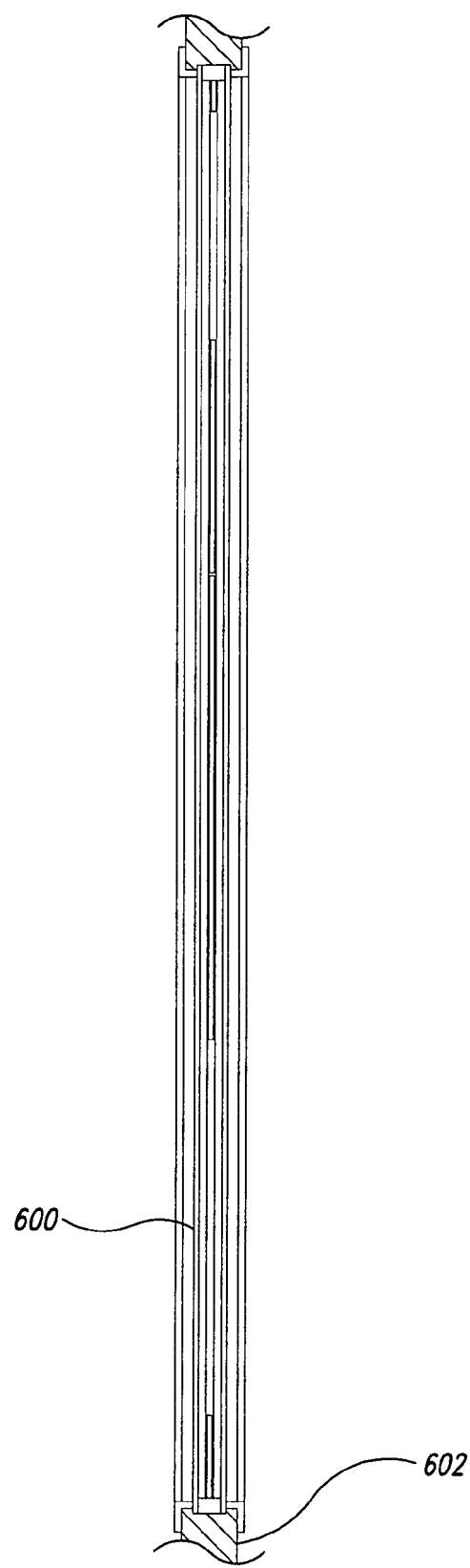
FIG. 15 is a cross-sectional view of the lite and a portion of the door of FIG. 14, viewed along section 15—15.

FIGS. 14 and 15 illustrate a door 600 having a lite 602 similar to that discussed above and shown in FIGS. 11 and 12. The lite 602 can be incorporated into the door 600 as generally understood in the art. The inventor appreciates that, having reviewed this disclosure, one of ordinary skill in the art will immediately appreciate that the inventive window and artistic pane can be incorporated into a wide variety of walls, doors, French doors and other configurations.

Figure 16:
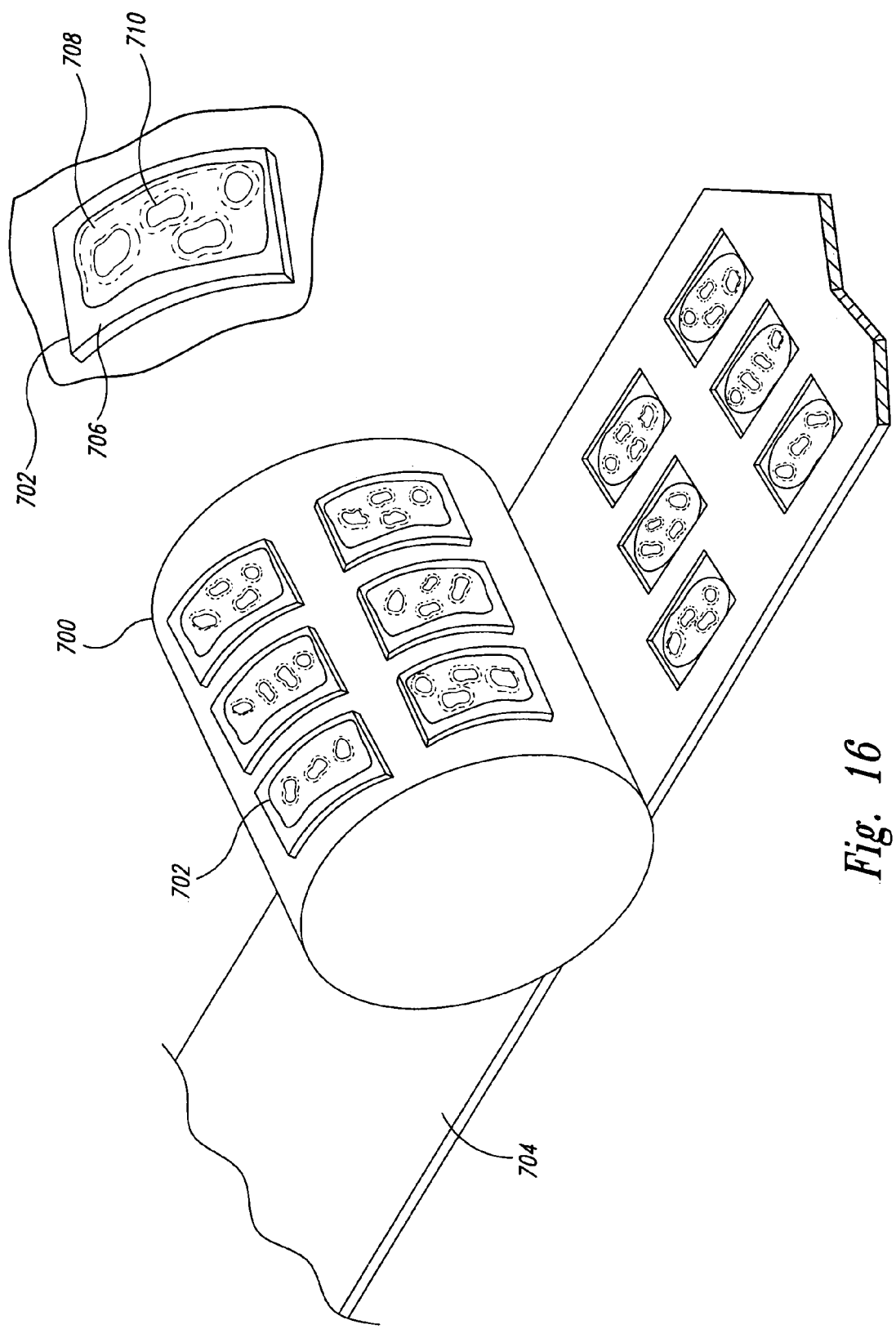
FIG. 16 is an isometric view schematically illustrating a method of rolling artistic panes according to an alternative embodiment of the present invention.

FIG. 16 schematically illustrates the method of forming artistic panes according to an alternate embodiment of the present invention. In the illustrated method, a roller 700 is configured with a number of dies 702 positioned to impart a desired shape onto a sheet of glass 704 as it moves past the roller 700. As best illustrated in the enlarged portion of FIG. 16, each of the dies 702 has a margin area 706 and a central area 708. The margin area 706 is raised with respect to the die 702, and the central area 708 is recessed within the margin area of the die. Within the central area 708 are a number of raised areas 710.

During use, when the die 702 molds the glass 704, the margin area 706 creates a flat and planar edge for an artistic pane, that can be received within a frame as discussed above. The recessed central area 708 forms the laterally offset central region of the artistic tile, and the raised areas 710 form the deformations in the artistic tile. One of ordinary skill in the art, having reviewed this disclosure, will appreciate the structures and requirements necessary for forming artistic tiles through the rolling process. In addition, one of ordinary skill in the art, after reviewing the present disclosure, will appreciate that there are other equivalent processes for forming artistic tiles according to the present invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for forming an artistic pane to create a desired visual effect, the method comprising:
   depositing a ceramic-based powder in a pattern on the upper surface of a substrate;
   supporting a sheet of glass on a structural member comprising a refractory material, the sheet of glass being spaced apart from the pattern of ceramic-based powder;
   heating the sheet of glass to a temperature in excess of a thermoplastic temperature for the glass at least until at least a central portion of the sheet of glass deforms into a complex shape onto the ceramic-based powder; and
   cooling the sheet of glass to fix the glass in the complex shape.

2. The method of claim 1 wherein heating the sheet of glass comprises heating an oven surrounding the sheet of glass.

3. The method of claim 1 wherein deforming a central portion of the material comprises positioning a frame around the pattern of ceramic-based powder and slump forming the portion of the glass inside the frame.

4. The method of claim 1 wherein deforming a central portion of the glass comprises roll forming the central portion of the glass.

5. The method of claim 1 wherein deforming a central portion of the glass comprises sag forming the central portion of the glass.

6. The method of claim 1, further comprising cutting at least a portion of the sheet of glass into the shape of a window frame, and inserting the portion of the sheet of glass into a window frame.

7. The method of claim 1, further comprising cutting at least a portion of the sheet of glass into a geometric shape, and inserting the portion of the sheet of glass into a came for a decorative window.

8. The method of claim 1, further comprising cutting at least a portion of the sheet of glass into a geometric shape, and inserting the portion of the sheet of glass into a came for a lite in a door.

9. A method for forming an artistic pane to create a desired visual effect, the method comprising:
   depositing a ceramic-based powder in a pattern on the upper surface of a substrate;
   supporting a sheet of glass spaced apart above the pattern of ceramic-based powder;
   heating the sheet of glass to a temperature in excess of a thermoplastic temperature for the glass at least until at least a central portion of the sheet of glass has deformed into a complex shape on top of the ceramic-based powder;
   cooling the sheet of glass to fix the glass in the complex shape; and removing the ceramic-based powder from the sheet of glass.

10. The method of claim 1 wherein deforming a central portion of the material comprises positioning an at least substantially planar frame around the pattern of ceramic-based powder and slump forming the portion of the glass inside the frame, and further comprising cutting the sheet of glass along a boundary created by the frame.

11. The method of claim 1 wherein supporting the glass spaced apart above the pattern of ceramic-based powder comprises positioning a frame around the pattern of ceramic-based powder and setting the sheet of glass onto the frame.

12. The method of claim 1 wherein the pattern of ceramic-based powder is randomly formed, such that it differs from pane to pane.

13. The method of claim 1 wherein the pattern of ceramic-based powder is deposited manually.

14. A method for forming artistic panes to create a desired visual effect, the method comprising:
   placing at least one frame on the upper surface of a substrate, the at least one frame having at least one opening;
   depositing a ceramic-based powder in a pattern on the upper surface of the substrate within the at least one opening of the at least one frame;
   supporting a sheet of glass spaced apart above the pattern of ceramic-based powder;
   heating the sheet of glass to a temperature in excess of a thermoplastic temperature for the glass at least until at least a portion of the sheet of glass has deformed into a complex shape within the opening on top of the ceramic-based powder; and
   cooling the sheet of glass to fix the glass in the complex shape.

15. The method of claim 14 wherein the at least one frame is at least substantially planar in shape and wherein heating the glass results in the portions of the glass that deform onto the at least one frame being at least substantially planar.

16. The method of claim 14 wherein the at least one frame is at least substantially planar in shape and wherein heating the glass results in the portions of the glass that deform onto the at least one frame forming an at least substantially planar boundary, and further comprising cutting the sheet of glass along the planar boundary.

17. The method of claim 14, further comprising cutting at least a portion of the sheet of glass into the shape of a window frame, and inserting the portion of the sheet of glass into a window frame.

18. The method of claim 14, further comprising cutting at least a portion of the sheet of glass into a shape, and inserting the shape into a decorative window.

19. The method of claim 14, further comprising cutting at least a portion of the sheet of glass into a shape, and inserting the shape into a lite for a door.

20. The method of claim 14, further comprising removing the ceramic-based powder from the sheet of glass.

21. The method of claim 14 wherein supporting the glass spaced apart above the pattern of ceramic-based powder comprises setting the sheet of glass onto the at least one frame.

22. The method of claim 14 wherein supporting the glass spaced apart above the pattern of ceramic-based powder comprises setting the sheet of glass onto the at least one frame, and further comprising cutting the sheet of glass along a contour in the glass formed by the at least one frame.

23. The method of claim 14 wherein supporting the glass spaced apart above the pattern of ceramic-based powder comprises setting the sheet of glass onto the at least one frame, and further comprising cutting the sheet of glass along a contour in the glass formed by the at least one frame.

24. A method for forming a plurality of artistic panes having a desired visual effect, the method comprising:

placing a plurality of frames on the upper surface of a substrate, the frames having a plurality of openings;

depositing a ceramic-based powder in a pattern on the upper surface of the substrate within the plurality of openings;

supporting a sheet of glass spaced apart above the pattern of ceramic-based powder;

heating the sheet of glass to a temperature in excess of a thermoplastic temperature for the glass at least until a portion of the sheet of glass has deformed into a complex shape within the opening on top of the ceramic-based powder;

cooling the sheet of glass to fix the glass in the complex shape; and cutting the sheet of deformed glass into a plurality of panes.

25. The method of claim 24 wherein depositing a ceramic-based powder comprises depositing powder in all of the openings.

26. The method of claim 24 wherein supporting the sheet of glass comprises resting the sheet of glass on the plurality of frames.

* * * * *